Nov. 8, 1927. 1,648,494
J. R. McWANE
PIPE JOINT
Filed Oct. 9, 1925
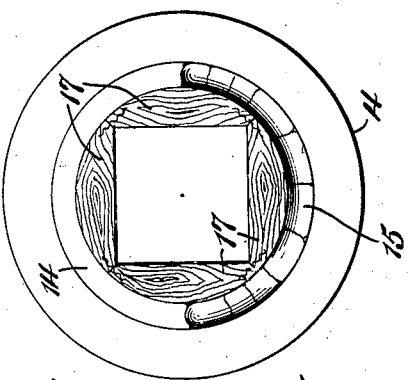
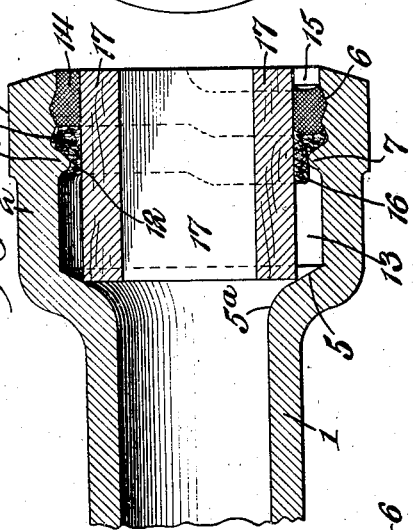
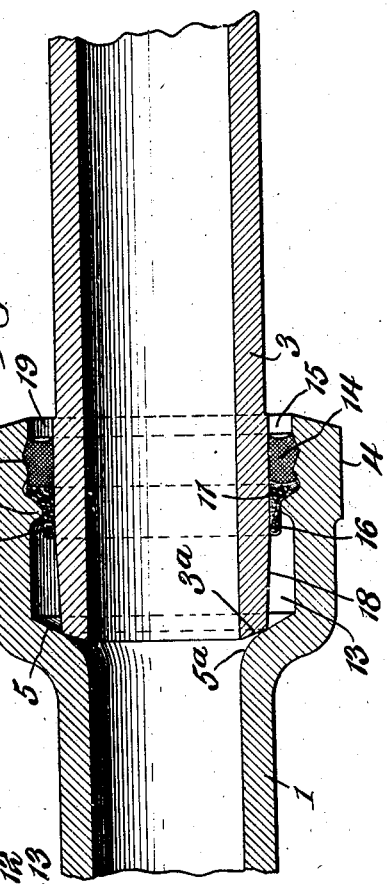
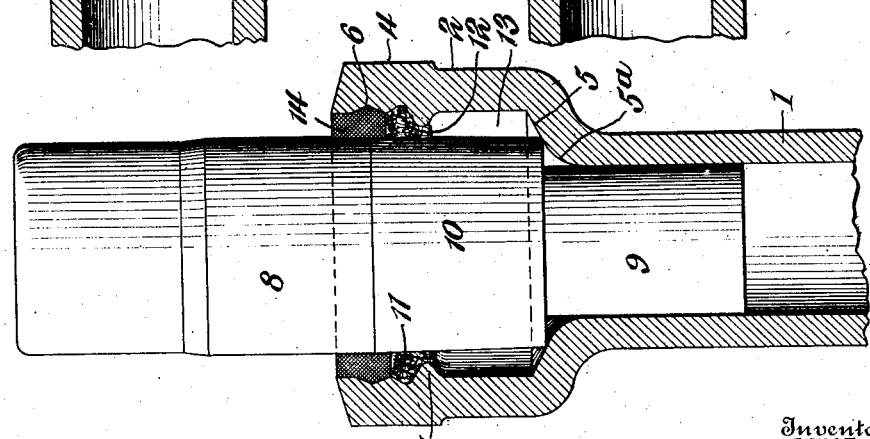
Inventor
James R. McWane
By
E. G. Siggers
Attorney
Witnesses
Chas. L. McDonald.
Howard D. Orr.

Patented Nov. 8, 1927.

1,648,494

UNITED STATES PATENT OFFICE.

JAMES R. McWANE, OF BIRMINGHAM, ALABAMA.

PIPE JOINT.

Application filed October 9, 1925. Serial No. 61,490.

This invention relates to pipe joints and is especially adapted for use in connection with prepared or pre-calked pipe joints, wherein the joint material is placed within the bell end of the pipe and partially precalked at the foundry and shipped to the field for use, the remaining calking necessary to complete the joint being easily accomplished in the trench after the spigot end has been properly introduced therein.

In patents issued to me on June 15, 1918 and March 11, 1924 for pipe joints and numbered 1,270,309 and 1,486,777 respectively, provision is made for the use of wedges which function as described therein, in the nature of small anvils against which an extra inner or bottom layer of jute or other fibrous calking or joint material is calked or packed for the purpose of maintaining a tight, leak-proof joint and which serve to act as a self-tightening joint even when the pipe line is deflected under sagging or load. These wedges, as well as the extra joint material, are expensive to make and to install, and the primary purpose of the present invention is to dispense with the use of the wedges and with the bottom layer of jute and to provide simple and easily formed means, which may be readily cast integrally with the bell end of the pipe, to serve the purpose of receiving an inner layer of jute and an outer layer of lead; to act as a uniform, continuous anvil against which said material may be partially pre-calked at the foundry, said means serving also, when the final or remaining calking is done in the field, after the spigot has been introduced therein, to direct the joint material against the spigot end of the pipe and allow a portion of said material to be subjected to maximum compression where immediately contacting with the spigot to form a more positive leak-proof joint.

Another object is to provide means, as above stated, that will not only serve as an abutment for the fibrous material and subject the same to said maximum compression when the calking is completed, but in addition will act as a fulcrum for the spigot end of the coacting pipe in the event the pipes are deflected by insufficient support, by overload, or from other forces, freely permitting the end of the spigot within the bell to move radially in any direction by being thus thrown out of longitudinal alinement, and yet maintaining the tight, leak-proof joint around the spigot.

The subject matter of the present application is shown and described in co-pending applications filed by me on July 29, 1925 for patents on goosenecks and bearing Serial Numbers 46,810 and 46,811, but no specific claim for the said matter is made therein and the disclosure is only sufficient to render an understanding of the inventions therein more readily obtained.

A full and complete understanding of the present invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:—

Figure 1 is a sectional view showing the improved bell end of a pipe with the prepared joint formed therein around a joint forming mandrel and prior to pre-calking the same, said figure being shown in upright position as when forming the joint.

Figure 2 is a sectional view of the bell having the joint partially pre-calked therein, the mandrel removed, and wooden retaining plugs or sections in place to protect the same in shipment.

Figure 3 is an end elevation of the subject matter of Figure 2.

Figure 4 is a sectional view of the joint around the spigot end of a coacting pipe, as when in a trench, the plugs or sections having been removed and the calking operation completed.

Referring to the drawing there is shown a portion of a cast iron pipe 1 of one of the smaller sizes, it being understood that the present invention, including the preformed type of joint, is more practical in use in connection with the smaller size service pipes. The pipe 1 is provided with the usual bell 2, and each section of the pipe is also provided with a plain or uninterrupted spigot end 3, the terminal of which is preferably bevelled, as indicated at 3ª in Figure 4 of the drawing.

The terminal flange 4 at the mouth end of the bell may have facets formed thereon to facilitate turning the same when desired, and the internal diameter of the socket in the bell is, of course, considerably greater than the external diameter of the spigot end 3, the inner end or bottom wall of the socket, as indicated at 5, being inclined or bevelled to substantially correspond with the bevelled end 3ª of the spigot, so that when the pipe line is deflected from any cause, the spigot end will be permitted to move radially within the socket without interference, in a manner to be explained. The said inclined bottom wall 5 is rounded, as at 5ª, to merge into the bore of the pipe and offer no projection to retard the flow of water or other liquid through the pipe, or to prevent the terminal of the spigot end from lateral movement.

Adjacent to the mouth of the bell there is provided, in the internal wall of the socket, one or more circumferential grooves 6, preferably of shallow V-shape form, the walls being at obtuse angles, as shown, such shape greatly facilitating the introduction of packing or joint material and causing the same to be crowded into close contact with the sides of the spigot end, when the calking operation takes place.

At a point substantially midway between the mouth and bottom wall of the bell, and adjacent to the groove or grooves 6, there is provided an internal, annular bead 7 formed integrally with the bell, at the time of casting the same, and having its inner edge rounded and of an internal diameter somewhat greater than the external diameter of the coacting spigot end 3, as clearly shown in Figure 4 of the drawing.

The opposite inner and outer side walls of the bead are rounded to merge into the internal walls of the socket, and such rounding serves to permit the joint material to be forced in between the inner edge of the bead and the wall of the spigot without unduly hindering such action, and aiding in giving to such projecting portion maximum compression and without damaging or tearing the said material.

In forming the prepared joint, prior to shipping the pipe to the location where the same is to be used, a mandrel 8 is first placed within the mouth of the bell, with the pipe in upright position, as shown in Figure 1 of the drawing. The mandrel is provided with a reduced lower end 9 which is inserted within the bore of the pipe, the shoulder thus provided on the mandrel resting upon the aforesaid inclined or bevelled bottom wall 5 of the socket. The lower end portion of the mandrel proper is slightly tapered from a point substantially midway of its length, as indicated at 10, so as to be more readily withdrawn from the packing or joint material after the joint has been formed.

A layer or ring of jute 11, or other suitable fibrous joint material, is placed within the mouth of the bell and around the mandrel and the same is given a partial calking, or a light calking, which forces the inner portion of the jute through the space between the bead 7 and the wall of the mandrel, to form a more highly compressed ring 12 extending through and into the chamber or cavity 13, formed by the bead at the inner or lower end of the socket. Lead is then poured into the remainder of the space at the mouth of the bell to form a ring 14, bearing against the aforesaid jute and flush with the outer end of the bell, as shown in Figure 1, the lead entering and filling the aforesaid groove 6 which serves, at all times, to hold the lead in place.

The lead ring is then tightly calked substantially half way around the same, while still retaining the mandrel, to form a depressed portion in the lead, as shown at 15 in Figure 2, such calking resulting in a tight compression of the lead around the area and a similar action on the jute affected thereby, which causes the aforesaid ring 12 of jute to be further forced through between the bead and mandrel, as indicated at 16, and to receive the maximum compression.

The mandrel is now removed from the mouth of the bell, the tapered portion 10 thereof permitting the same to be easily pulled out, and wooden sections 17, having arcuate outer faces to form a perfect circle of the same diameter as the diameter of the mandrel, are then inserted into the joint material, and said sections are suitably held together to remain in the prepared pipe joint and protect the same from damage until the pipe is to be laid in the trench and the joint completed, when said protecting members are removed therefrom.

The terminal portion of the spigot end 3 of the coacting pipe, which is tapered, as at 18, to correspond with the taper on the mandrel, is then inserted into the prepared joint, which has been placed in the trench with the pre-calked portion 15 located at the lower side thereof. With the bevelled end 3ª abutting against the inclined bottom wall 5 of the bell socket, the upper or remaining half of the lead is then calked, as shown at 19 in Figure 4 of the drawing, when the entire ring of lead and jute is tightly compressed around the spigot end, and the jute has been forced uniformly through the space between the bead and spigot, to receive the maximum compression entirely around the same, the remaining projecting portions 16 of the jute being further forced through.

The above-method of laying the pipe in the trench with the pre-calked portion of the joint beneath the same effects a great saving in the cost of digging the trench, as it is unnecessary to provide the usual bell holes or enlargements in the trench for the purpose of calking the bottom half of the joint, and when the joint is completed with the tightly compressed portions 16 of the jute projecting into the inner chamber or cavity 13, the action of the water or other liquid in the pipe line causes the same to swell and to further tighten the joint in an obvious manner.

When the first half of the calking is done, with the mandrel in position within the bell, the said mandrel is caused to be deflected somewhat into an eccentric position within the bell, by reason of the expansion of the lead and jute in a radial direction, but such eccentricity does not interfere with the withdrawal of the mandrel, nor with the subsequent completion of the calking operations on the joint, and when the spigot 3 is inserted therein and the final upper half of the lead ring is calked, said spigot is forced back into a concentric position again and in true longitudinal alinement with the adjacent pipe section. The bevelled or inclined surfaces 3ª and 5 of the spigot and bell respectively do not interfere with this readjustment of the coacting parts, and the amount of space between the bead and the spigot is sufficient also to permit this readjustment but small enough to prevent the bulk of the jute from being forced through, so that the bead acts as an actual abutment for the jute, while permitting the necessary amount to be forced through when the calking is completed.

Should the pipe line be deflected from any cause, or be moved out of alinement in any direction, the point of the spigot end, where contacting with the highly compressed jute between the bead and the spigot, will fulcrum on the said bead, while the terminal 3ª of the spigot may move in any direction radial to the center, by reason of the space provided by the cavity 13, and at the time of such deflection the actual sealing portion of the jute, between the bead and spigot, receives the minimum disturbance by reason of such fulcruming action.

From the foregoing it will be seen that simple means have been provided in the bells of cast iron pipes whereby a prepared joint may be readily formed in the same for coaction with the spigot of adjoining pipe sections, and that said means serves to give a great compression to portions of the fibrous material, forming part of the joint, to maintain a tight, leak-proof joint under all conditions, whether the pipe line remains in true alinement or is deflected from any cause, and that the joint freely permits of such deflection without danger of breakage to the bell or spigot, or damage or impairment of the said joint.

What is claimed is:—

In a pre-formed, semi-calked pipe joint including a bell end and a spigot end, said bell having an internal diameter greater than the bore of the pipe and having a bevelled annular bottom wall, said spigot having a bevelled end to abut the bottom wall to permit deflection of the spigot and being tapered substantially from the longitudinal center of the bell to the end of the spigot, an inwardly extending annular bead formed integrally on the inner wall of the bell somewhat forward of the center of the same and substantially at the base of said tapered portion of the spigot, the bead having a rounded inner edge spaced from the external wall of the coacting spigot, and having a bevelled outer face to deflect fibrous joint material inwardly toward the spigot when calked and to permit the inner portion of said material to be squeezed between the rounded bead and spigot and receive maximum compression at that point without cutting the fibrous material, said bell having an annular groove formed in the internal wall thereof immediately in advance of the bead to retain the fibrous material and merging into the bevelled outer face thereof, and said bell also having an annular lead-retaining groove adjacent to the mouth thereof, said groove having oppositely inclined inner and outer walls to permit the lead to freely enter to fill the same and to be forced inwardly against the spigot when calked and held from outward movement.

In testimony, that I claim the foregoing as my own, I have hereto affixed my signature.

JAMES R. McWANE.